United States Patent [19]

Yeager et al.

[11] 4,356,985

[45] Nov. 2, 1982

[54] AIRCRAFT TIRE

[75] Inventors: Robert W. Yeager, Akron; Larry J. Gehrett, Atwater, both of Ohio

[73] Assignee: The Goodyear Tire & Rubber Company, Akron, Ohio

[21] Appl. No.: 238,317

[22] Filed: Feb. 26, 1981

[51] Int. Cl.³ .................. B60C 13/00; B64C 25/32
[52] U.S. Cl. .................. 244/103 R; 152/154; 152/209 R; 152/353 R; 244/105
[58] Field of Search .......... 152/209 R, 209 WT, 153, 152/154, 330 C, 352 R, 353 R, 353 C, 353 G; 244/103 R, 105

[56] References Cited

U.S. PATENT DOCUMENTS 3,204,681  9/1965  Olagnier et al. ............. 152/154
4,057,089 11/1977  Johannsen ................. 152/209 R
4,299,264 11/1981  Williams .................. 152/209 R

FOREIGN PATENT DOCUMENTS 123925  7/1930  Austria ..................... 152/154
 38887 11/1924  Norway ..................... 152/154
241912  1/1926  United Kingdom ............. 152/154

Primary Examiner—Edward C. Kimlin
Assistant Examiner—Lois E. Boland
Attorney, Agent, or Firm—L. R. Drayer

[57] ABSTRACT

An aircraft tire having a liquid deflector extending outwardly from at least one sidewall, a first plurality of grooves in the tread and a second plurality of grooves disposed axially outwardly of the tire relative to the first plurality of grooves for directing water from the first plurality of grooves toward the respective liquid deflectng means. The first plurality of grooves may interconnect to direct water to the second plurality of grooves each of which may extend at an angle of between about 25 and 35 degrees relative to a radial plane of the tire passing through the respective groove.

10 Claims, 3 Drawing Figures

AIRCRAFT TIRE

This invention relates to tires and, more particularly aircraft tires.

Some aircraft may have engines mounted in locations which are subject to contact by spray of water from contact of the tires with puddles of water during take-off and landing. Such spray may cause extinguishment of the engines. For example, small aircraft may have engines mounted on the fuselage, and spray from a nose gear tire of the aircraft may be carried over the wings and into the engines.

An object of this invention is to provide an aircraft tire wherein water contacted by the tire during landing or take-off is channeled in such a manner that the water is not directed into the engines of the aircraft during take-offs and landings in given depths of water which may otherwise be deep enough to cause the water to be directed into the engines.

Other objects of this invention will become apparent from the description provided hereinafter.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
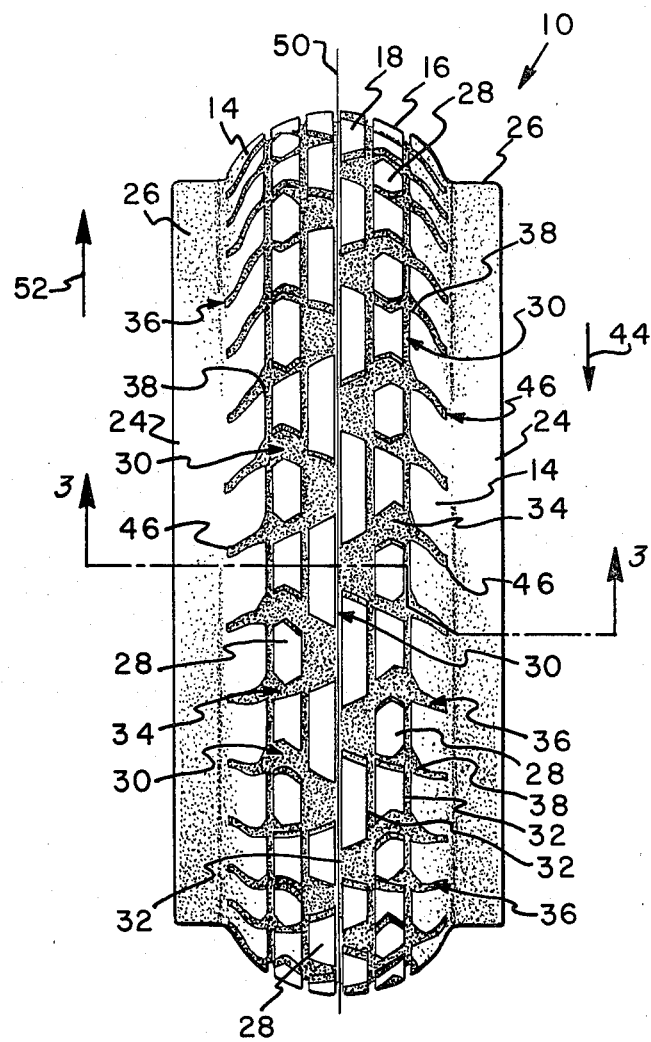
FIG. 1 is a front elevational view of a tire embodying this invention.

There is shown in the drawings a tire 10 which is a toroidal-shaped composite structure of reinforced elastomeric material having a pair of circular inextensible beads 12, a pair of sidewalls 14 extending outwardly from the beads 12 to a tread 16 which extends circumferentially of the tire 10. The tread 16 is provided with a radially outer ground-engaging surface 18. The term "radially" refers to a direction perpendicular to the axis of rotation of a tire. The ground-engaging surface 18 of the tread 16 is determined by the portion of tread which touches the ground in the tire's footprint when the tire 10 is under rated load and pressure. The tire 10 may be reinforced in any manner consistent with good engineering practice such as with a conventional radial or bias carcass ply structure 20 extending between the beads 12 and may have belts or breakers 22 between the carcass ply structure 20 and the tread 16.

Liquid deflecting means such as a rib 24 of elastomeric material integrally molded to a sidewall 14 of the tire 10 extends outwardly from one or both of the sidewalls 14 of the tire 10. Each rib 24 is provided with a radially outer surface 26 which extends generally parallel to the axis of rotation of the tire for impingement thereon and redirection of water from the ground contact area of the tread 16. These ribs 24 may not be sufficient to prevent enough water from continuing in a direction upward and rearward of the aircraft to enter and extinguish the engines. These ribs 24 are spaced radially from the ground-engaging surface 18 of the tread 16 when the tire 10 is under rated load and pressure such that the ribs 24 will not contribute to the development of water spray by coming into contact with the surface of most puddles of water which the aircraft may be required to land in or take off in. This distance is preferably at least about 5/16 inch to ride above the surface of water to levels of about one-quarter inch.

The tread 16 is provided with a plurality of tread elements 28 which are separated by a plurality of circumferential grooves 32 spaced apart generally over the width of the tread 16 and which are preferably interconnected by a plurality of transverse grooves 34 which extend to the sidewalls 14 for channeling water in the contact patch of the tread 16 toward the tread edges of the tire 10 where it can then be effectively channeled toward the liquid deflecting means 24 rather than splashed haphazardly from the tread contact patch. For the purposes of this specification and the claims, all of the grooves in the tread 16 including circumferential grooves 32 and/or transverse grooves 34 are referred to collectively as a first plurality of grooves and are shown generally in the drawings as 30. For the purposes of this specification and the claims, a tread is distinguished from the sidewalls of a tire in that the tread touches the ground as the tire travels through its footprint while mounted on a vehicle under rated load and pressure, and the sidewalls do not touch the ground under such conditions. As previously indicated, the first plurality of grooves 30 are preferably interconnecting grooves.

A second plurality of grooves 36 is disposed axially outwardly of the tire 10 relative to the first plurality of grooves 30. The term "axially" refers herein to a direction parallel to the axis of rotation of a tire. Each of the second plurality of grooves 36 communicates at one end 38 with the first plurality of grooves 30 and extends from that end 38 along the respective sidewall 14 toward the respective liquid deflecting means 24 to channel water from the first plurality of interconnecting grooves 30 toward the respective liquid deflecting means 24.

Water in the contact area of a tread 16 is provided by the tire's rotation with kinetic energy so that the water not sufficiently deflected by the ribs 24 may be directed as it leaves the tire 10 generally upward and rearward of the aircraft to enter and extinguish the engines if the kinetic energy is not otherwise sufficiently discharged. It is believed that by channeling this water as it is being evacuated from the tread contact patch in a direction contra to the direction of natural flow (the direction of natural flow being toward the rear of the aircraft), the kinetic energy of the water may be dissipated to such an extent that the water will not be directed as far upward and rearward as it would otherwise have been directed. However, if it is attempted to channel the water in a direction which is at too great of angle relative to the direction of its natural flow, the water simply will not flow in that direction and instead may be splashed from the tread contact patch without sufficient loss of kinetic energy to prevent it from entering and extinguishing the engines. Therefore, each of the second plurality of grooves 36 extends preferably at an angle, illustrated at 40 in FIG. 2, of between about 25 and 35 degrees relative to a radial plane 42 of the tire 10 passing through the respective groove 36 to direct the water as it leaves the tread contact patch in a preferred direction relative to the direction of natural flow. By "radial plane" is meant a plane which contains a tire's rotational axis.

Figure 2:
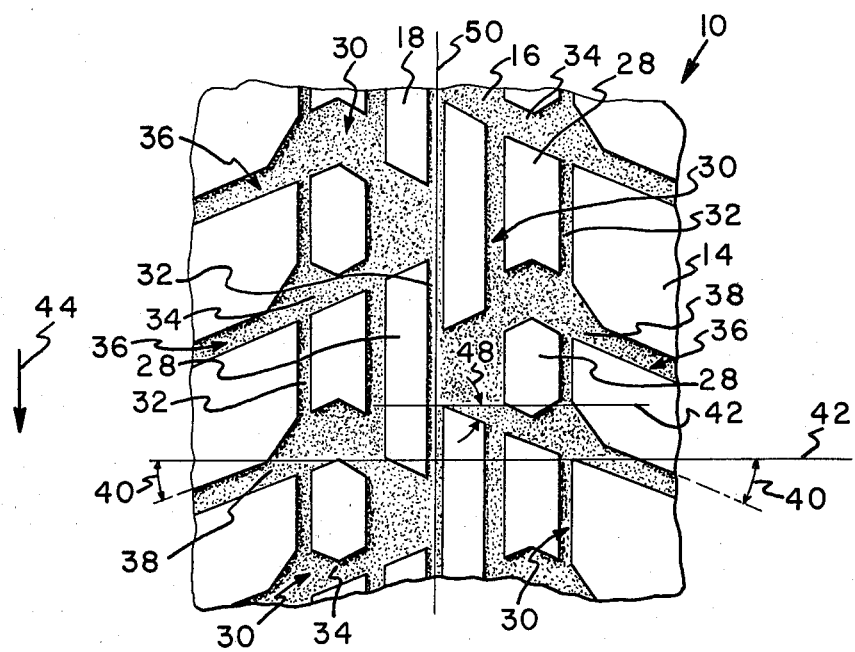
FIG. 2 is an enlarged view of a portion of the tread and sidewalls of the tire shown in FIG. 1.
Figure 3:
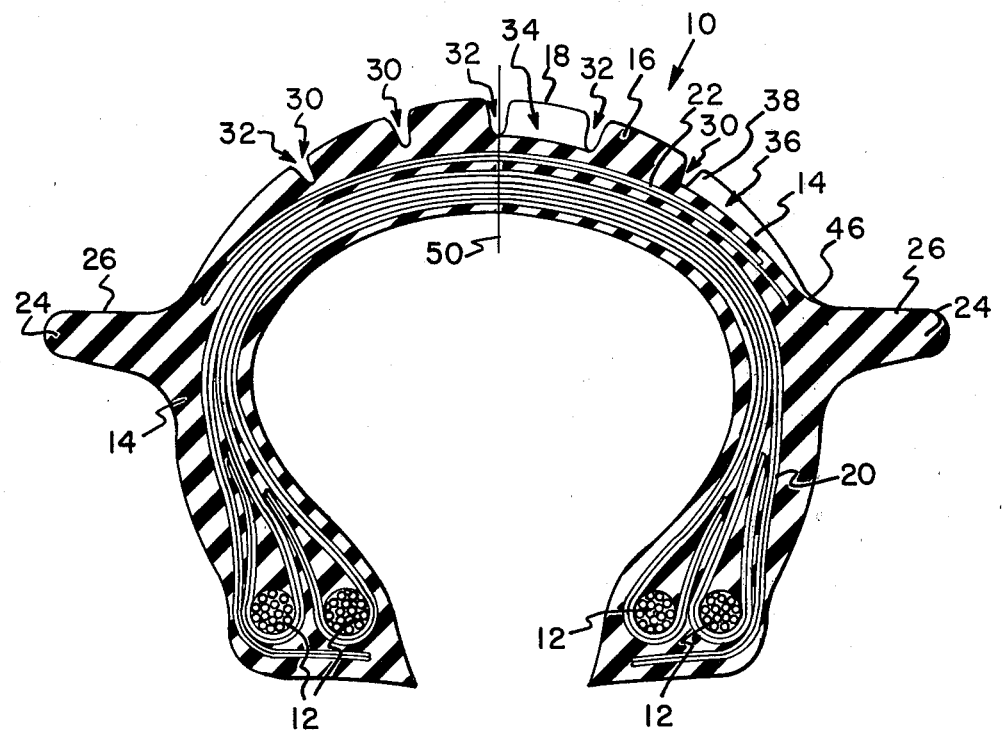
FIG. 3 is an enlarged cross-sectional view of the tire of FIG. 1 taken along line 3—3 thereof.

Each of the second plurality of grooves 36 extends from its end 38 toward the respective rib 24 in the same circumferential direction of the tire 10, as illustrated at 44 in FIGS. 1 and 2. Such a tire 10 may therefore be called a directional tire and is mounted on the aircraft to rotate as illustrated at 52 in FIG. 1 so that the second plurality of grooves 36 extend from their ends 38 in a forwardly direction of the aircraft as the corresponding tread portion touches the ground in going through the footprint to direct the flow of water in more of a forwardly direction of the aircraft. It is preferred that each of the second plurality of grooves 36 extend to a point 46 closely adjacent the respective liquid deflecting means 24 to provide maximum channeling effect.

Although the first plurality of grooves 30 are preferably interconnected, the effectiveness of the preferred groove angle 40 of the second plurality of grooves 36 is not believed to be diminished if the first plurality of grooves 30 are not interconnected such as if they comprised only circumferential grooves 32. On the other hand, the effectiveness of the first plurality of interconnected grooves 30 is not believed to be diminished by a second plurality of grooves 36 which may not extend at the preferred angle 40.

In order to more effectively dissipate the kinetic energy of the water and to more efficiently channel the water into the second plurality of grooves 36, at least some of the transverse grooves 34 in the tread 16 which open into the second plurality of grooves 36 extend substantially in the same direction, as illustrated at 48 in FIG. 2, relative to radial planes of the tire passing through the respective grooves, as the second plurality of grooves extend. In other words, angle 48 is substantially equal to angle 40.

In order to permit a greater quantity of water to be absorbed into the contact patch of the tread 16 and thereafter channeled to the liquid deflecting means 24 and thereby minimize uncontrollable splashing therefrom, the tread 16 preferably has a net-to-gross ratio which is not greater than 40. For purposes of this specification and the claims, the net-to-gross ratio is defined as the ratio of the total surface area of tread material which touches the ground during one revolution of a tire under rated load and pressure to the product of the circumference of the tread's radially outer surface at the mid-circumferential plane 50 of the tire when the tire is under rated pressure and unloaded, and the tread width. The "mid-circumferential plane" of a tire is defined for this purpose as a plane perpendicular to a tire's rotational axis and lying midway between the tread edges. The tread width is defined for this purpose as the distance between the tread edges as measured in a direction parallel to the tire's rotational axis when the tire is under rated load and pressure. The tread edges are determined for this purpose from the tire's footprint at the location of maximum width thereof. Although this invention is related more particularly to aircraft tires, it may also be useful in other types of tires where it may be desirable to redirect the spray of water therefrom.

While certain representative embodiments and details have been shown for the purpose of illustrating the invention, it will be apparent to those skilled in the art that various changes and modifications may be made therein without departing from the spirit or scope of the invention.

What is claimed is:

1. A tire comprising:

a pair of circular inextensible beads and a pair of sidewalls extending outwardly from said beads to a tread which extends circumferentially of said tire, said tread having a radially outer ground-engaging surface determined by the portion of said tread which touches the ground in the footprint of the tire when the tire is under rated load and pressure while said sidewalls do not touch the ground under such conditions, an integrally molded liquid-deflecting means extending axially outward from at least one sidewall and spaced radially from said ground-engaging surface of the tread when the tire is mounted on a vehicle under rated load and pressure, said tread being provided with a plurality of tread elements separated by a first plurality of interconnecting grooves, said first plurality of interconnecting grooves comprising a plurality of circumferential grooves spaced apart over the width of the tread which are interconnected by a plurality of transverse grooves which extend to said sidewalls for channeling water toward the edges of said tread as determined by the maximum width of the tire's footprint, and a second plurality of grooves disposed axially outwardly, with respect to the axis of rotation of the tire, of the first plurality of interconnected grooves, said second plurality of grooves communicating at one end with the first plurality of grooves and extending along the respective sidewall toward the respective liquid-deflecting means to channel water from the first plurality of interconnecting grooves toward the respective liquid-deflecting means.

2. A tire according to claim 1, wherein each of said second plurality of grooves extends at an angle of between about 25 and 35 degrees relative to a radial plane of the tire passing through the respective groove.

3. A tire according to any one of claims 1 or 2, wherein said liquid deflecting means is spaced radially from the ground-engaging surface of the tread when the tire is mounted on an aircraft under rated load and pressure a distance equal to at least about 5/16 inch.

4. A tire according to any one of claims 1 or 2, wherein said second plurality of grooves each extend to a point closely adjacent said respective liquid deflecting means.

5. A tire according to claim 3 wherein the transverse grooves of said first plurality of interconnected grooves extend substantially in the same direction relative to radial planes of the tire passing through the respective transverse grooves as said second plurality of grooves extend.

6. A tire according to claim 5, wherein the tread has a net-to-gross ratio which is not greater than 0.40.

7. A tire according to claim 6, wherein said second plurality of grooves each extend to a point closely adjacent said respective liquid deflecting means.

8. A tire according to any one of claims 1 or 2, wherein each of said second plurality of grooves extends toward said respective liquid deflecting means in the same circumferential direction of the tire.

9. A tire according to any one of claims 1 or 2, wherein the tread has a net-to-gross ratio which is not greater than 0.40.

10. The combination of an aircraft, having engines mounted in locations subject to contact by tire splashed liquid, and a nose gear tire, said nose gear tire comprising:

a pair of circular inextensible beads and a pair of sidewalls extending outwardly from said beads to a tread which extends circumferentially of said tire, said tread having a radially outer ground-engaging surface determined by the portion of said tread which touches the ground in the footprint of the tire when the tire is under rated load and pressure while said sidewalls do not touch the ground under such conditions, an integrally molded liquid-deflecting means extending axially outward from at least one sidewall and spaced radially from said ground-engaging surface of the tread when the tire is mounted on a vehicle under rated load and pressure, said tread being provided with a plurality of tread elements separated by a first plurality of interconnecting grooves, said first plurality of interconnecting grooves comprising a plurality of circumferential grooves spaced apart over the width of the tread which are interconnected by a plurality of transverse grooves which extend to said sidewalls for channeling water toward the edges of said tread as determined by the maximum width of the tire's footprint, and a second plurality of grooves disposed axially outwardly, with respect to the axis of rotation of the tire, of the first plurality of interconnected grooves, said second plurality of grooves communicating at one end with the first plurality of grooves and extending along the respective sidewall toward the respective liquid-deflecting means to channel water from the first plurality of interconnecting grooves toward the respective liquid-deflecting means.

* * * * *